United States Patent [19]
Kwok et al.

[11] Patent Number: 6,167,123
[45] Date of Patent: *Dec. 26, 2000

[54] ONE NUMBER VOICE FAX DATA PBX CALL DISCRIMINATION

[75] Inventors: Leo Y. Kwok, Milpitas; Zafer Khalid, San Jose; Bernard Guillot, Redwood City, all of Calif.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/717,448

[22] Filed: Sep. 20, 1996

[51] Int. Cl.[7] .................................................. H04M 11/00
[52] U.S. Cl. ............................. 379/100.01; 379/93.11; 379/93.14
[58] Field of Search .............................. 379/93.01, 93.11, 379/93.14, 93.26, 156, 157, 164, 165, 167, 171, 177, 179, 182, 183, 100.01, 100.05, 100.06, 100.09, 112, 115, 116; 358/400, 407, 442, 468, 434, 436, 438

[56] References Cited

U.S. PATENT DOCUMENTS

| | | |
|---|---|---|
| 5,222,126 | 6/1993 | Nishino .................................... 379/157 |
| 5,233,648 | 8/1993 | Nakamura .............................. 379/93.11 |
| 5,327,487 | 7/1994 | Brown et al. ....................... 379/100.17 |
| 5,410,416 | 4/1995 | Amberg et al. .......................... 358/405 |
| 5,448,626 | 9/1995 | Kajiya et al. ....................... 379/100.08 |
| 5,488,651 | 1/1996 | Giller et al. ........................ 379/100.14 |
| 5,544,229 | 8/1996 | Creswell et al. ........................ 379/112 |

FOREIGN PATENT DOCUMENTS 407074826A 3/1995 Japan ............................... H04M 3/42

Primary Examiner—Curtis A. Kuntz
Assistant Examiner—Melur Ramakrishnaiah

[57] ABSTRACT

A PBX call discrimination system which provides voice, FAX, and data services utilizing one telephone number (DID) for each local line being serviced. The PBX connects incoming lines to local lines serviced by it. Each local line is identified by a DID received in a call setup message on the incoming line. The PBX stores information associating a voice call extension, a FAX line, and a modem line with each DID. The PBX identifies an incoming call as being a voice call, a FAX transmission, or a data transmission. The incoming call is connected to the FAX line associated with that DID if the incoming call is identified as a FAX transmission, and to the modem line associated with that DID if the incoming call is identified as a data transmission. FAX and modem servers can be connected to the PBX for directing FAX and data transmissions, respectively, to the intended called party. The routing information utilized by such servers is provided by the PBX.

26 Claims, 1 Drawing Sheet

ONE NUMBER VOICE FAX DATA PBX CALL DISCRIMINATION

FIELD OF THE INVENTION

The present invention relates to telecommunications, and more particularly, to a private branch exchange (PBX) and a method for operating the PBX to provide voice, FAX, and modem services utilizing a single telephone number.

BACKGROUND OF THE INVENTION

In the age of modern communications, a business person has typically two and often three telephone numbers. The first is for conventional voice communications, the second is for receiving FAX transmissions, and the third is for data communications via modem. In a typical office setting serviced by a PBX, the FAX transmissions are directed to a FAX server which is determined by the telephone number to which the FAX transmission is directed. Since the number of FAX lines that are reserved in any system is much smaller than the number of voice lines, FAX transmissions for a number of recipients are printed at the same FAX machine and are then delivered to the various recipients.

As a result, FAX transmissions lack privacy. This lack of privacy can be a problem in many settings. For example, in communications between a lawyer and her client, a transmission to the client at his place of business may expose confidential material to the office personnel, and, in some instances, may even lead to a waiver of the attorney-client privilege.

The only method for providing security for FAX transmissions in the prior art systems utilizing a PBX requires the FAX sender to provide information that identifies the recipient. For example, if the recipient has a private FAX machine, the sender can direct the FAX to the telephone number associated with that FAX machine. Unfortunately, this solution requires a separate telephone number for each user's FAX transmissions. In addition to requiring the sender to know a second telephone number, this solution increases the number of direct inward dial numbers (DIDs) that must be provided by the PBX at the recipient's end of the transmission.

If the PBX has a FAX server that recognizes called party information that is inserted into the FAX header, the FAX server can direct the FAX to the called party. This solution also requires the sender to insert information specifying the called party. There is no standard format for such called party identification information. Hence, the caller must be familiar with the particular system used by each recipient.

Broadly, it is the object of the present invention to provide an improved PBX system. It is a further object of the present invention to provide a PBX system in which a single telephone number can be used for voice, FAX, and modem communications while providing the same level of privacy for FAX and modem communications as provided for voice communications.

These and other objects of the present invention will become apparent to those skilled in the art from the following detailed description of the invention and the accompanying drawings.

SUMMARY OF THE INVENTION

A PBX according to the present invention provides voice and FAX services (as well as modem services, if desired) utilizing only a single DID for each local voice line being serviced. FAX and modem servers can be connected to the PBX for directing FAX and data transmissions, respectively, to the intended called party.

More specifically, in the present invention a PBX connects any of a plurality of incoming lines to any of a plurality of local lines with each local line being identified by a DID received in a call setup message on the incoming line. In one arrangement, the PBX includes means for storing information associating a FAX line with each DID, means for identifying an incoming call as being either a FAX transmission or a voice call, and means for connecting the incoming call to the FAX line associated with that DID if the incoming call is identified as a FAX transmission. If the FAX line is connected to a FAX server that can route the received FAX transmissions to a destination provided in a FAX header, the present invention inserts the routing information associated with the DID into the header. Modem communications are handled in a manner analogous to FAX transmissions.

DETAILED DESCRIPTION OF THE INVENTION

Figure 1:
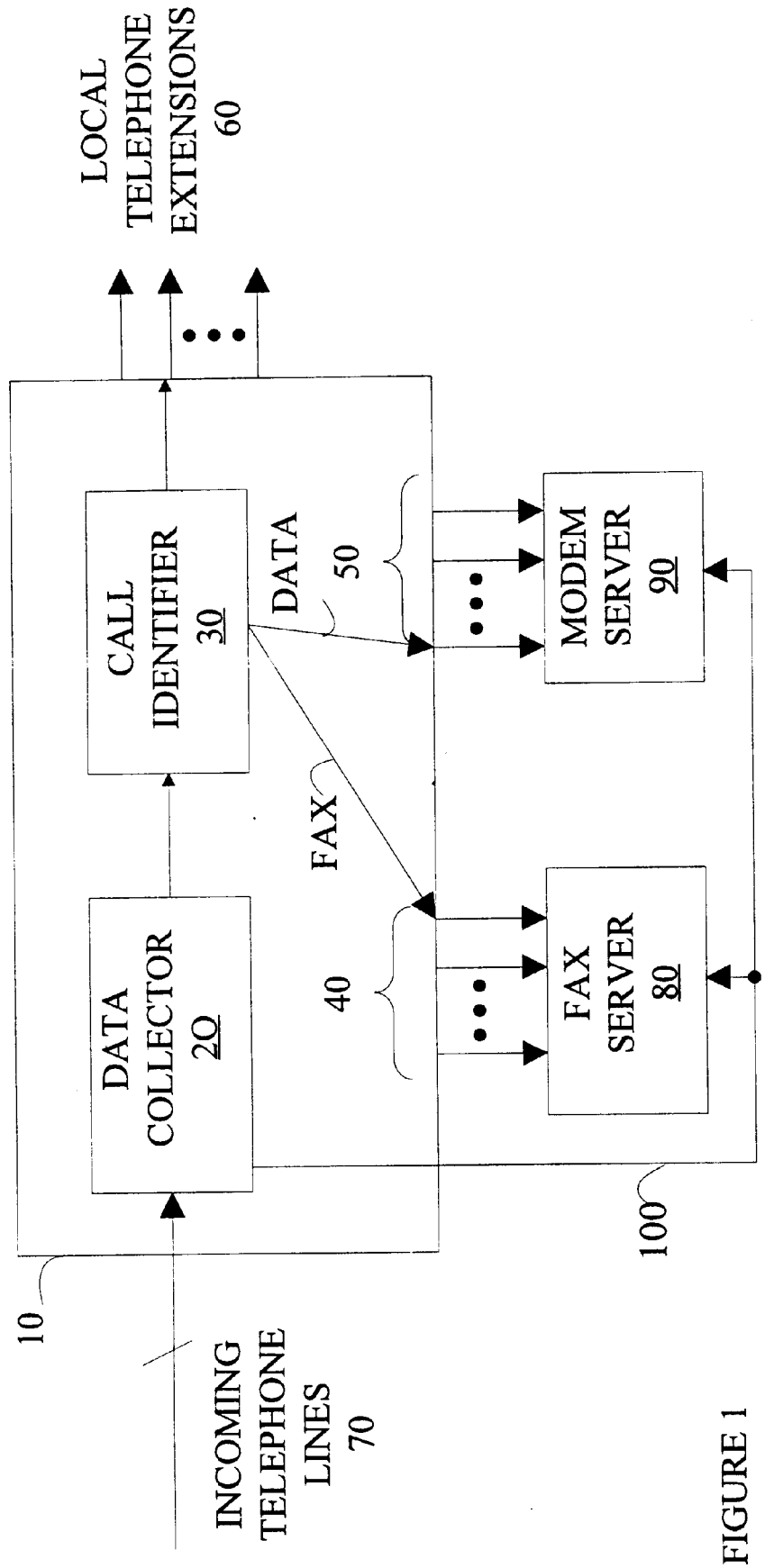
FIG. 1 is a block diagram of the preferred embodiment of a PBX call discrimination system according to the present invention.

FIG. 1 is a block diagram of one embodiment of the present invention. PBX 10 includes a data collector 20, a call identifier 30, a plurality of FAX server ports 40, a plurality of modem server ports 50, and a plurality of telephone line extension ports 60. Preferably one DID is available for each called party on the PBX. Each DID may be associated with a voice call extension and a FAX line port, as well a modem line port, which are preassigned to each called party being serviced by the PBX. This information is stored by data collector 20.

Data collector 20 is coupled to the incoming telephone lines 70 to receive the incoming call identification information contained in the call setup information associated with each incoming telephone call. This information includes the DID number identifying the called party. The manner in which the call identification information is received will, in general, be determined by the type of telephone service. In conventional analog telephone systems, the DID is received on the incoming line as a series of tones. In ISDN systems, the call setup information is transmitted in a separate channel from that used for the telephone connection.

The incoming call may be either a FAX transmission, a data transmission, or a voice call. When an incoming call is received, data collector 20 collects the called party information, and matches the particular DID with the associated FAX port extension, modem port extension, and voice call extension for the intended recipient of the transmission or call. The called party information and the extension information is collectively referred to as integration information.

From data collector 20, the incoming call is sent to call identifier 30. The manner in which call identifier 30 operates will, in general, depend on the type of telephone service. For example, ISDN lines may utilize a protocol that identifies the call as being a voice, FAX or a data call. In this arrangement, the incoming ISDN line is routed based on the protocol. The protocol provides information to FAX server 80 or modem server 90 which already contains information related to the called party. In the preferred embodiment of this example, the called party's extension does not ring when a FAX or data call is received and routed to the FAX or modem server.

In the case of a conventional analog phone system, call identifier 30 includes circuits for detecting an audible tone associated with FAX and modem transmissions. The type of tone detected identifies whether the call is a FAX transmission or a data transmission. If no tone is detected, call identifier 30 assumes that the call is a voice call. If a voice call is identified, the call is routed in the conventional manner to the called party's preassigned telephone extension 60. If the call is identified as a FAX transmission, call identifier 30 routes the call from PBX 10 to a FAX line on FAX server 80. In the preferred embodiment of the present invention, FAX server 80 is coupled to PBX 10 at a plurality of FAX server ports 40. Similarly, if the call is identified as a data transmission, call identifier 30 routes the call from PBX 10 to a modem server 90. Modem server 90 is preferably coupled to PBX 10 at a plurality of modem server ports 50.

The call identifier 30 detects FAX or data tones when the incoming call is being answered by the called party. In this embodiment, an incoming call is directed to an extension as a normal call, but when the called party answers, the call identifier 30 determines the type of call by monitoring for FAX or data tones. If a voice call is detected, the call is connected in a normal fashion. If a FAX or a data call is detected, the PBX intercepts the call and routes it to the proper device or server with the integration information. Moreover, as an option, the PBX can play a pre-recorded announcement to signal to the called party that a FAX or a data call has arrived and is being routed to the proper device. Instead of a voice announcement, this notification can be done in the form of text display if the called party uses a display telephone.

In another embodiment, call identifier 30 is not used and the PBX provides additional features. The PBX configures a feature code for the subscriber/called party. When a subscriber receives a FAX or a data call at the subscriber's extension, the subscriber can inform the PBX of the type of call by using the feature code. This feature code allows the PBX to automatically connect the call to the predefined FAX or data handling destination while avoiding a call transfer. The feature code can, for example, be a button, identified as a "FAX" button, on the subscriber's telephone. Thus, when the subscriber presses the "FAX" button, the call is immediately connected to the FAX handling destination. A call transfer is not acceptable because the call may be dropped during the time needed for the transfer.

The activation of call redirection by call identifier 30 can be configured in a switch (e.g., a PBX switch or a central office switch.) The activation of call redirection without call identifier 30 can also be configured in a switch.

In the case of FAX and data transmission calls, the integration information is provided from data collector 20 to FAX server 80 and modem server 90, respectively. This information may be provided via a data link 100; however, any means that is compatible with the particular servers may also be used for this purpose.

During a FAX transmission, FAX server 80 receives the integration information (i.e., called party information and the extension of the FAX server port preassigned to the called party) at approximately the same time it receives the FAX transmission routed from call identifier 30. Accordingly, FAX server 80 is informed that the incoming FAX transmission being received on a particular FAX server port 40 is intended for a particular called party. Additionally, upon recognizing the called party information received from data collector 20, FAX server 80 can then direct the incoming FAX transmission to the desired called party. The manner in which the integration information is delivered to the servers will, in general, depend on the type of server. For example, if the FAX server is capable of extracting the integration information from the FAX header, then data collector 20 will insert the information into the FAX header in the format expected by the server. In this case, the integration information is provide in the header rather than by data link 100.

FAX server 80 may also utilize a FAX mail system which routes the FAX transmission directly to the called party's computer. Such a system drastically reduces breaches of privacy discussed above with reference to conventional FAX systems servicing multiple users. Alternatively, a FAX E-mail system may be programmed to notify the called party via his computer that a FAX transmission is being received for him at a preassigned, secured FAX machine.

Similarly, during a data transmission, modem server 90 receives integration information from data collector 20 via data link 100 while receiving a data transmission directed to a DID. The data transmission is routed to one of the modem server ports 50 from call identifier 30. Modem server 90 then directs the data transmission received on a particular modem server port 50 identified in the integration information to the desired called party's computer.

In one embodiment of the present invention, the subscriber can determine or change the FAX or data handling destination. This is done by entering a telephone number associated with the desired FAX or data handling destination. Thus, the desired FAX or data handling destination can be identified by either a local or a outside telephone number. In this arrangement, the subscriber enters a special code number for changing handling destinations and then enters the desired telephone number. In another arrangement, commands for changing the handling destination can be provided through a voice mail system. In this situation, the new telephone number is still communicated directly to the PBX such that the PBX can change the routing path for that subscriber. Thus, the redirection is configured in a switch (e.g., a PBX switch or a central office switch).

The above described PBX provides a call discrimination system in which voice and FAX, or voice and modem are provided utilizing only a single DID for each called party serviced by the PBX. The PBX receives incoming calls and is able to discriminate or identify whether that call is a voice call, a FAX transmission, or a data transmission, and then routes that call to a preassigned voice, FAX, or data line, respectively. Conventional FAX and modem servers are able to receive the transmissions and to direct the transmissions to the intended called party based on the information provided to them by the PBX's data collector.

Thus, the present invention reduces the number of DIDs which must be provided by the PBX and is capable of providing the same level of privacy for FAX and modem transmissions as is provided for voice communications. In addition, the PBX limits the need for the sender and called party to have the same FAX and modem protocols, since the translation of the integration information to the format expected by the server is accomplished by the data collector which "knows" the type of server connected to the PBX.

Although the invention has been described with reference to a specific embodiment, this description is not intended to be limiting. Various modifications to the present invention will become apparent to those skilled in the art from the foregoing description and accompanying drawing. Accordingly, the present invention is to be limited solely by the scope of the following claims.

What is claimed is:

1. A private branch exchange (PBX) switch for connecting an incoming call to any of a plurality of local voice and fax lines, each said voice line being identified by an identifier received with the incoming call, comprising:

memory means for storing information associating a FAX line with each identifier;

means, independent of the identifier, for automatically distinguishing incoming voice calls from incoming facsimile transmissions, said means for automatically distinguishing being capable of distinguishing voice calls and facsimile transmissions placed from integrated services digital network (ISDN) and from analog phone systems, said means for automatically distinguishing including means for extracting an ISDN call set up message; and means for connecting an incoming call classified as a FAX transmission to said FAX line associated with said received identifier and connecting an incoming call classified as a voice call to the voice line identified by said received identifier.

2. The switch of claim 1, wherein the identifier is a direct inward dial number (DID).

3. The switch of claim 2, wherein a FAX server is connected to said FAX line and which further comprises means for providing routing information determined by said received DID to said FAX server.

4. The switch of claim 3, wherein a FAX transmission includes a FAX header and wherein said means for providing said routing information comprises means for inserting information determined by said DID into said FAX header.

5. The switch of claim 3, wherein said FAX server comprises a FAX mail system for notifying the intended called party of an incoming FAX transmission.

6. The switch of claim 2, further comprising:

means for storing information associating a data line with each DID;

means for recognizing an incoming call as being a data transmission; and means for connecting said incoming call to said data line associated with said received DID if said recognizing means recognizes said incoming call as a data transmission.

7. The switch of claim 2, wherein a user associated with one of the voice lines can change said information associating a FAX line with that user's DID.

8. The switch of claim 1, wherein said means for distinguishing operates after a called party answers said incoming line.

9. The switch of claim 1, wherein said means for distinguishing recognizes a feature code.

10. The switch of claim 1 wherein said means for automatically distinguishing includes means for detecting fax tones.

11. A private branch exchange (PBX) switch for connecting an incoming call to any of a plurality of local voice and data lines, each of said voice lines being identified by an identifier received with the incoming call, comprising:

memory means for storing information associating a data line with each identifier;

means, independent of the identifier, for automatically distinguishing incoming voice calls from incoming data transmissions, said means for automatically distinguishing being enabled to distinguish voice calls and data transmissions placed from integrated services digital network (ISDN) and from analog phone systems, said means for automatically distinguishing including means for extracting an ISDN call set up message; and means for connecting an incoming call classified as a data transmission to said data line associated with said received identifier and connecting an incoming call classified as a voice call to the voice line identified by said received identifier.

12. The switch of claim 11 wherein the identifier is a DID.

13. The switch of claim 12, wherein a modem server is connected to said modem line and wherein said switch further comprises means for providing routing information determined by said received DID to said modem server.

14. The switch of claim 12, wherein a user associated with one of the voice lines can change said information associating a modem line with that user's DID.

15. The switch of claim 11, wherein said means for distinguishing operates after a called party answers said incoming line.

16. The switch of claim 11, wherein said means for distinguishing recognizes a feature code.

17. A method for operating a private branch exchange switch so as to connect an incoming call to any of a plurality of local voice and fax lines, each of said voice lines being identified by an identifier received with the incoming call, the method comprising the steps of:

storing information associating a FAX line with each identifier;

automatically distinguishing, independently of the identifier, incoming voice calls from incoming FAX transmissions, said distinguishing step distinguishing calls placed from integrated services digital network (ISDN) systems and from analog phone systems, said automatically distinguishing step further including extracting an ISDN call set up message when such a message is present; and connecting an incoming call classified as a FAX transmission to said FAX line associated with said received identifier and connecting an incoming call classified as a voice call to the voice line identified by said received identifier.

18. The method of claim 17, wherein the identifier is a DID.

19. The method of claim 18, wherein a FAX server is connected to said FAX line and wherein said method further comprises providing routing information determined by said received DID to said FAX server.

20. The method of claim 19, wherein said FAX server includes means for receiving a FAX header and wherein said step of providing said routing information comprises inserting information determined by said DID into said FAX header.

21. The method of claim 19, further comprising:

storing information associating a data line with each DID; and connecting said incoming call to said data line associated with said received DID if said incoming call is identified as a data transmission.

22. The method of claim 18, wherein a user associated with one of the voice lines can change said information associating said FAX line with each DID.

23. The method of claim 17, wherein said distinguishing occurs after a called party answers said incoming line.

24. The method of claim 17, wherein said distinguishing step includes recognizing a feature code.

25. A method for operating a switch so as to connect an incoming call to any of a plurality of local voice and data lines, each of said voice lines being identified by an identifier received with said incoming call, the method comprising the steps of:

storing information associating a modem line with each identifier;

automatically distinguishing, independently of the identifier, incoming voice calls from incoming data transmissions, said distinguishing step distinguishing calls placed from integrated services digital network (ISDN) systems and from analog phone systems, said automatically distinguishing step further including extracting an ISDN call set up message when such a message is present; and connecting an incoming call classified as a data transmission to said data line associated with said received identifier and connecting an incoming call classified as a voice call to the voice line identified by said received identifier.

26. The method of claim 25, wherein a data server is connected to said data line, and wherein said method further comprises the step of providing routing information determined by said received identifier to said data server.

* * * * *